(12) United States Patent
Brown et al.

(10) Patent No.: US 11,005,713 B2
(45) Date of Patent: May 11, 2021

(54) DOWNSTREAM MESSAGING TO CONFIGURE ENDPOINTS AND TRANSMIT COMMANDS

(71) Applicant: Itron, Inc., Liberty Lake, WA (US)

(72) Inventors: Scott Dale Brown, Raleigh, NC (US); Jason Estes, Spokane, WA (US)

(73) Assignee: Itron, Inc., Liberty Lake, WA (US)

( * ) Notice: Subject to any disclaimer, the term of this patent is extended or adjusted under 35 U.S.C. 154(b) by 169 days.

(21) Appl. No.: 16/024,342

(22) Filed: Jun. 29, 2018

(65) Prior Publication Data
US 2019/0349248 A1 Nov. 14, 2019

Related U.S. Application Data

(60) Provisional application No. 62/669,868, filed on May 10, 2018.

(51) Int. Cl.
| | |
|---|---|
| *G06F 15/16* | (2006.01) |
| *H04L 12/24* | (2006.01) |
| *H04L 12/26* | (2006.01) |
| *H04L 29/08* | (2006.01) |
| *G06F 3/06* | (2006.01) |

(52) U.S. Cl.
CPC .......... *H04L 41/082* (2013.01); *H04L 41/046* (2013.01); *H04L 41/085* (2013.01); *H04L 43/04* (2013.01); *H04L 67/10* (2013.01); *G06F 3/0629* (2013.01)

(58) Field of Classification Search
CPC ... G06F 3/0629; H04L 41/046; H04L 41/082; H04L 41/085; H04L 43/04; H04L 67/10; H04L 67/125; H04L 67/34

USPC .................................................. 709/206, 223
See application file for complete search history.

(56) References Cited

U.S. PATENT DOCUMENTS

| | | | |
|---|---|---|---|
| 2002/0049817 A1* | 4/2002 | Drory | H04L 51/36 709/206 |
| 2014/0097966 A1* | 4/2014 | Alexander | H04W 84/18 340/870.02 |
| 2016/0080837 A1* | 3/2016 | Cornwall | H04Q 9/00 340/870.02 |

(Continued)

OTHER PUBLICATIONS

PCT Search Report and Written Opoinion dated Jul. 15, 2019, for PCT Application No. PCT/US2019/030493, 14 pages.

*Primary Examiner* — Liang Che A Wang
(74) *Attorney, Agent, or Firm* — Lee & Hayes, P.C.

(57) ABSTRACT

Techniques for transmitting messages to send configuration information, and/or commands, to features, agents, applications and/or other aspects of endpoints and/or networked computing devices. In an example, server, a host of an analytics platform, or other computing device may send messages within a network to an endpoint that is remote from the computing device. In the example, a first message may be sent to a first agent operating on the endpoint, wherein the first message directs configuration of a first feature of the first agent. The computing device may receive consumption data from the endpoint, which may be monitored and/or analyzed by the analytics platform of the computing device. In the example, a second message may be sent to a second agent operating on the endpoint, wherein the second message has a parameter that allows free-format data, and wherein a command is encoded within the parameter.

19 Claims, 6 Drawing Sheets

(56) References Cited

U.S. PATENT DOCUMENTS

2017/0039372 A1\* 2/2017 Koval .................... G01D 4/004

\* cited by examiner

DOWNSTREAM MESSAGING TO CONFIGURE ENDPOINTS AND TRANSMIT COMMANDS

RELATED APPLICATIONS

This patent application claims priority to U.S. patent application Ser. No. 62/669,868, titled "Downstream Messaging to Configure Endpoints and Transmit Commands", filed on 10 May 2018, commonly assigned herewith, and hereby incorporated by reference.

BACKGROUND

In a networked environment, messages may be sent from one or more applications running on a central server to one or more endpoint computing devices on, or near, the edge of the network. The ability to send commands from the applications to the endpoints devices may be based at least in part on the existing firmware on the endpoints and/or other networked devices. If the firmware does not support transmission of commands, a complete firmware update may be required to provide the functional enhancements. In some systems, additional changes may be required at the central server. Accordingly, transmission of commands over a network may require major revisions and expense.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Overview

The disclosure describes examples of techniques for transmitting messages to send configuration information and/or commands, to features, agents, applications and/or other aspects of endpoints and/or networked computing devices. In an example, a central office, server, host of an analytics platform and/or other computing device may send messages within a network to an endpoint that is remote from the computing device. In the example, a computing device may send a first message to a first agent operating on the endpoint, wherein information within a data structure of the first message directs configuration or re-configuration of a feature of the first agent. The computing device may receive consumption data from the endpoint, which may be monitored and/or analyzed by an analytics platform of the computing device. A second message may be sent to the same or different agent operating on the endpoint. The second message may provide a command or encoded command within the data structure. The command may be executed by the agent.

In a second example, an endpoint may be configured (e.g., an electricity meter, gas meter, and/or water meter) within an advanced metering infrastructure (AMI) to perform tasks associated with automatic meter reading (AMR) and other techniques in communication with an analytics platform. In example operation, an agent operating on the endpoint may receive a first message. The first message may contain a data structure (e.g., a data string) with information that allows configuration of a first feature of the agent. The endpoint may send consumption data from the endpoint to the computing device. An agent operating on the endpoint may receive a second message, wherein the data structure of the second message includes a command. In response to execution of the command by the agent, the endpoint may send a command feature response from the agent to the analytics platform and/or main office server.

Example Systems and Techniques

Figure 1:
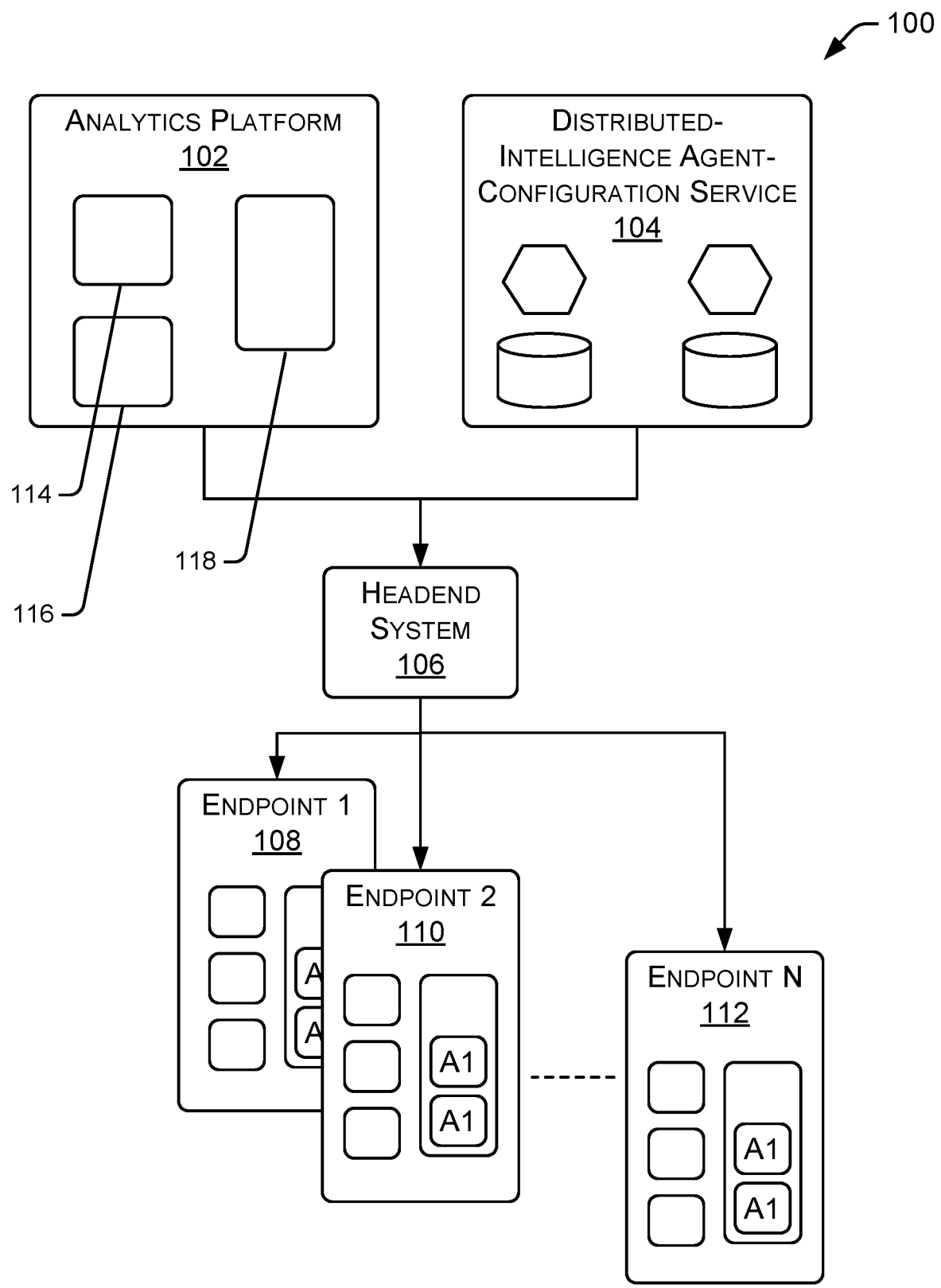
FIG. 1 is a block diagram showing networked devices, wherein configuration information and/or commands are sent to one or more endpoints.

FIG. 1 shows an example system 100 of networked devices. The example system 100 may be configured as an advanced metering infrastructure (AMI) that performs tasks associated with automatic meter reading (AMR) and other smart grid functions in the fields of utility services, such as electricity, natural gas and/or water. Also in the example system 100, an analytics platform 102 may send configuration information to one or more endpoints 108-112, and receive feature data in response. Additionally, the analytics platform 102 may send commands to the one or more endpoints 108-112, and receive a command feature response.

The analytics platform 102 may include a number of analytics applications or programs 114-118. The analytics programs 114-118 may consume and provide data as part of the functionality of the system 100. In examples, the analytics programs 114-118 may receive consumption data, temperature data, time and date data, and other data. The analytics programs 114-118 may generate data related to consumption forecasts, comparisons of past and/or present data, possible utility theft, possible grid or network failures or aging, etc.

A distributed-intelligence agent-configuration service 104 operates to update, track and record the versions of software and/or firmware used by endpoints and/or networked devices on the system 100. Examples of the updating and recording of version numbers include description of applications, programs, agents, and features operating and/or installed on a plurality of endpoints and/or network devices. In an example, an endpoint may host a plurality of agents, each configured with one or more features operable for particular purposes. The distributed-intelligence agent-configuration service 104 may upgrade and/or record the status of software and/or firmware versions operable on each agent and/or feature of each endpoint.

The distributed-intelligence agent-configuration service 104 may also send, track and record data concerning commands sent to a plurality of endpoints. Data recorded for each command may include information regarding the endpoint, the agent, the feature and any parameters or returned values associated with each command.

The system 100 may include a headend system and/or operations center 106 including one or more devices to route messages through the system.

Figure 2:
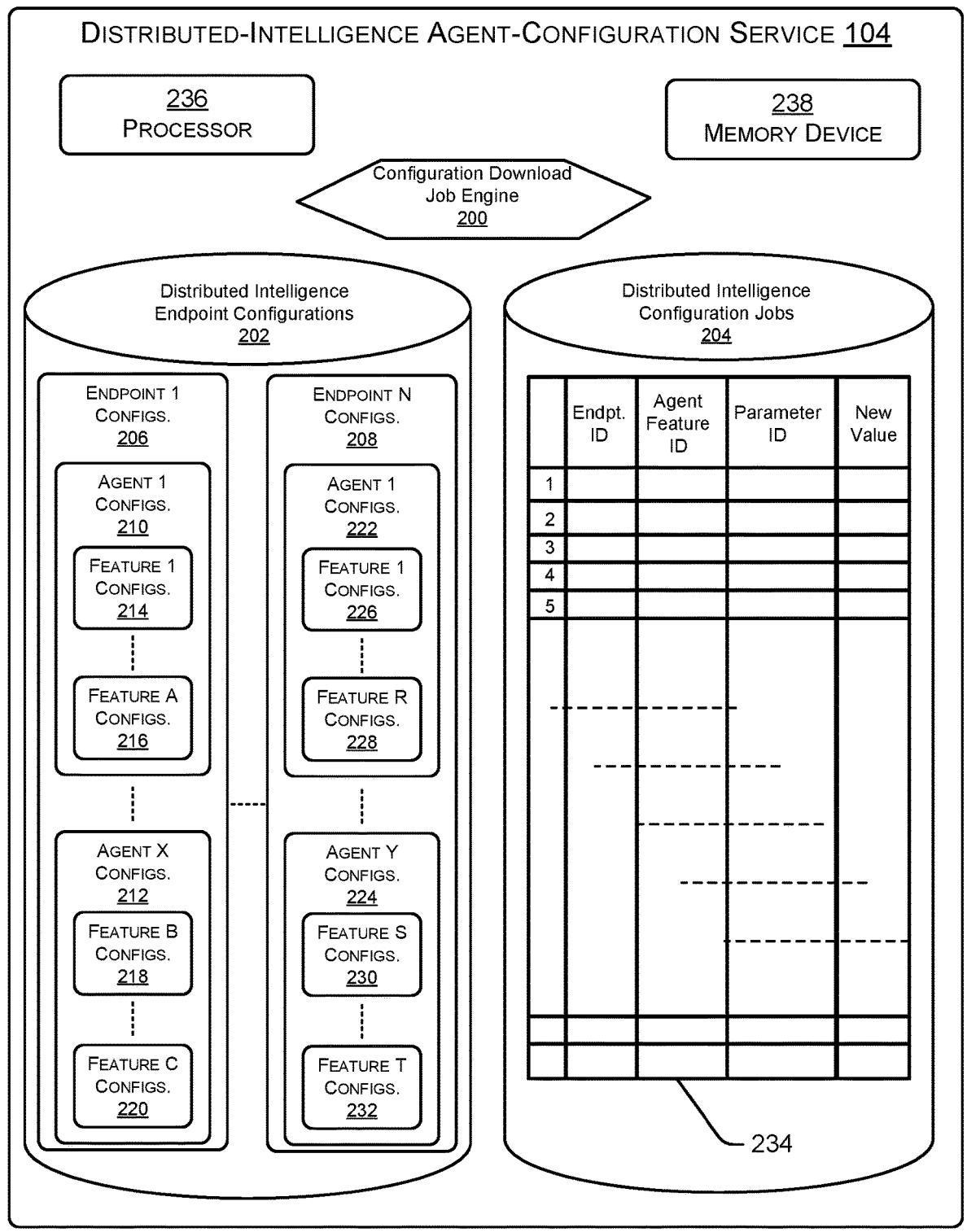
FIG. 2 is a block diagram showing example structures and techniques used to configure and operate a distributed-intelligence agent-configuration service.

FIG. 2 shows example structures and techniques used to configure and operate the distributed-intelligence agent-configuration service 104. A configuration download job engine 200 is configured to transmit and receive data between a main office, server or other "cloud" computing environment and a plurality of networked devices, such as endpoints within an AMI/AMR environment. In the example shown, distributed-intelligence endpoint-configurations database 202 records and maintains configuration data associated with a plurality of endpoints 1 through N. A distributed intelligence configuration jobs database 204 records and maintains data regarding software jobs performed at each endpoint.

The distributed-intelligence agent-configuration service 104 may be defined by statements executed by a processor 236 and stored in a memory device 238. The distributed-intelligence endpoint-configurations database 202 records and distributed intelligence configuration jobs database 204 may be configured within the memory device 238, or configured in large-scale memory devices, as shown in FIG. 2.

The distributed-intelligence endpoint-configurations database 202 is configured to provide configuration data 206, 208 describing the configuration of a plurality of endpoints 1 through N. Each endpoint 1 through N may be configured with a plurality of agents, features in agents, applications, or other software and/or firmware code and/or data structures. Accordingly, the configuration data 206, 208 records the configuration of the software, firmware, programming and/or data structures of each of a plurality of endpoints.

In the example shown, configuration data 206 describes the settings, configuration, version, etc. of endpoint 1. The data 206 may be segregated to contain configuration data 210, 212 on a plurality of agents associated with the endpoint 1. The configuration data 210 shows settings and configurations (e.g. version numbers, etc.) associated with an agent operating on an endpoint. Within the data associated with the agent, data 214, 216 describes the settings of several features of the agent 1.

Similarly, the configurations 208 of endpoint N include data 222, 224 describing the configurations for a plurality of agents. The settings for each agent include configuration data 226-232 for a plurality of features associated with each agent.

Accordingly, the distributed-intelligence endpoint-configurations database 202 is a record of the settings, configurations, versions, etc. of a plurality of endpoints, respective agents, respective features, and other software, firmware, programming and data structures.

The distributed intelligence configuration jobs database 204 records and maintains data regarding software jobs performed at each endpoint. In the example shown, a data structure 234 records information for a plurality of endpoints, including features and command parameters. The example data structure 234 manages information including an endpoint identification (ID), an agent and/or feature ID, parameter ID, and/or new values of a feature, variable and/or parameter. Additional and/or alternative information could be recorded and maintained, as indicated by particular system requirements.

Figure 3:
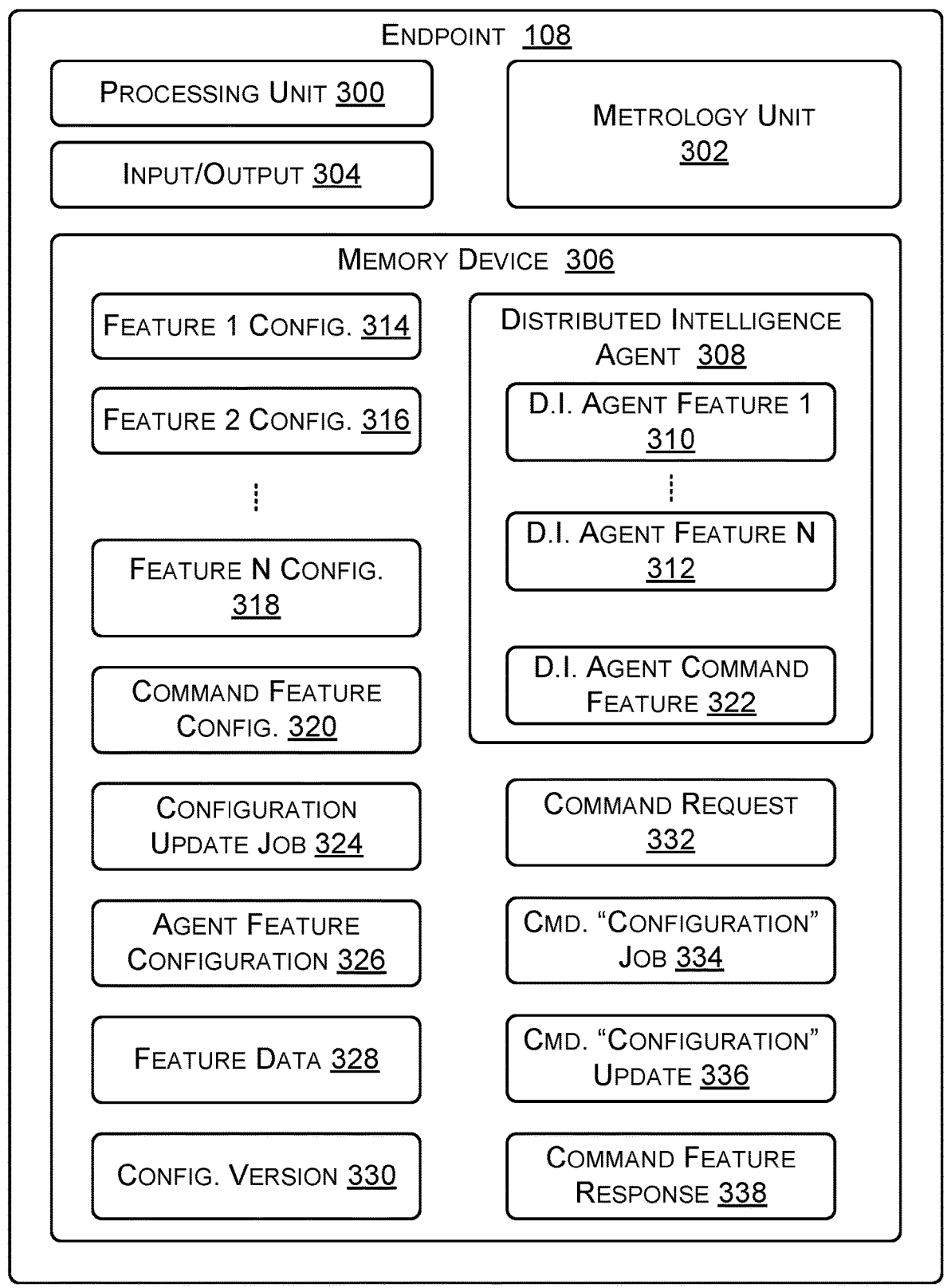
FIG. 3 is a block diagram showing example structures and techniques used to configure and operate an endpoint.

FIG. 3 shows example structures and techniques used to configure and operate an endpoint 108. A processing unit 300 may be in communication with a metrology unit 302, input/output communications devices 304 and/or a memory device 306. The memory device may contain programming and data as indicated by requirements of the system. In the example shown, a distributed intelligence agent 308 is representative of such agents, a plurality of which may be installed on the endpoints. The example shown, agent 308 includes distributed intelligence agent features 310, 312, representing features 1 through N. Each feature 310, 312 may be configured according to configuration data in feature configuration modules 314-318, which may be received from the distributed-intelligence agent-configuration service 104 (seen in FIG. 1 and FIG. 2). Example command feature configuration data 320 may be used to configure an example distributed-intelligence agent command feature 322. Accordingly, features within the distributed intelligence agent 308 may be configured by data in feature configuration modules 314-318, which may be received from the distributed-intelligence agent-configuration service 104, described in FIGS. 1 and 2.

The endpoint 108 may receive a configuration update job 324 and/or an agent feature configuration 326 from the distributed-intelligence agent-configuration service 104. The configuration update job 324 may be executed, such as by execution of software code, to update the configuration of an agent on the endpoint 108. The agent feature configuration 326 may be used to provide data indicating how the update should be performed. In response to the update, the endpoint 108 may response by returning feature data 328 and/or a configuration version number 330 to the analytics platform 102 and/or distributed-intelligence agent-configuration service 104 (both seen in FIG. 1 and/or FIG. 2). The returned feature data 328 may provide information regarding the updated feature (e.g., feature 310). The configuration version number 330 may be used to label and understand the status of the software in a feature 310, agent 308 and/or endpoint 108. The configuration version number 330 also confirms that an update(s) have been performed.

A command request 332 may be sent to the endpoint 108 to direct the endpoint (e.g., an agent 308 and/or feature 310 of the endpoint) to perform a particular function. A command configuration job 334 and/or a command configuration update 336 may be sent to the endpoint 108 with executable programming statements encoded within a parameter of a configuration message. The parameter may be free-format, i.e., of flexible format that allows developers to build custom command messages. Accordingly, the command(s) encoded within parameters of the configuration message allow it to function as a command message. In some instances, the executable programming statements or code can be used to perform configuration updates, particularly where configuration parameters are not fully exposed. A command feature response 338 may be sent by the endpoint 108 to the analytics platform 102 and/or distributed-intelligence agent-configuration service 104, to report the results of execution of the programming statements/code.

Figure 4:
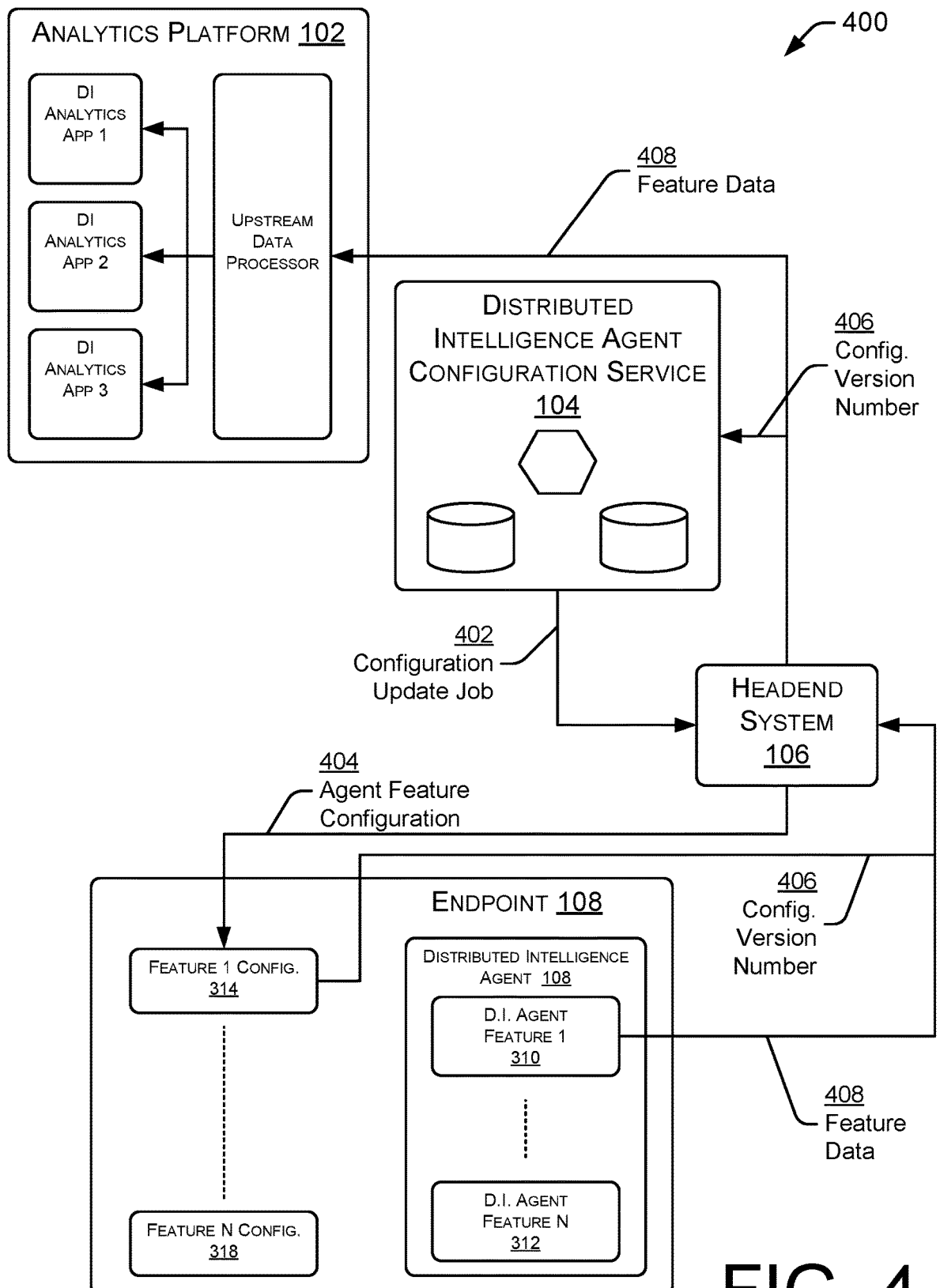
FIG. 4 is a block diagram showing techniques to reconfigure features of agents operable at endpoints.

FIG. 4 shows techniques for use in a system 400 to reconfigure agents, and/or features of agents, operable at endpoints. In the example system 400, the distributed-intelligence agent-configuration service 104 sends a configuration update job 402 and/or agent feature configuration 404. In an example, the purpose of the configuration update job 402 and/or agent feature configuration 404 may be to update the configuration of an agent, and/or a feature portion of an agent, of an endpoint 108. The updated may revise or enhance settings, updated software, updated software version, etc. The configuration update or configuration 402, 404 may be sent to a feature configuration module 314, 316, which may configure (or reconfigure) a respective distributed-intelligence agent feature 310, 312.

The feature configuration module 314, 316 may increment or update a configuration version number 406. The configuration version number 406 may be passed upstream to the distributed-intelligence agent-configuration service 104.

In the example shown, one or more distributed-intelligence agent features 310, 312 may generate and send feature data 408 upstream to the analytics platform 102. In the example shown, feature data 408 is data (e.g., data output generated by the features) and that is returned to a central office, analytics platform 102 or other tool, application or repository.

Figure 5:
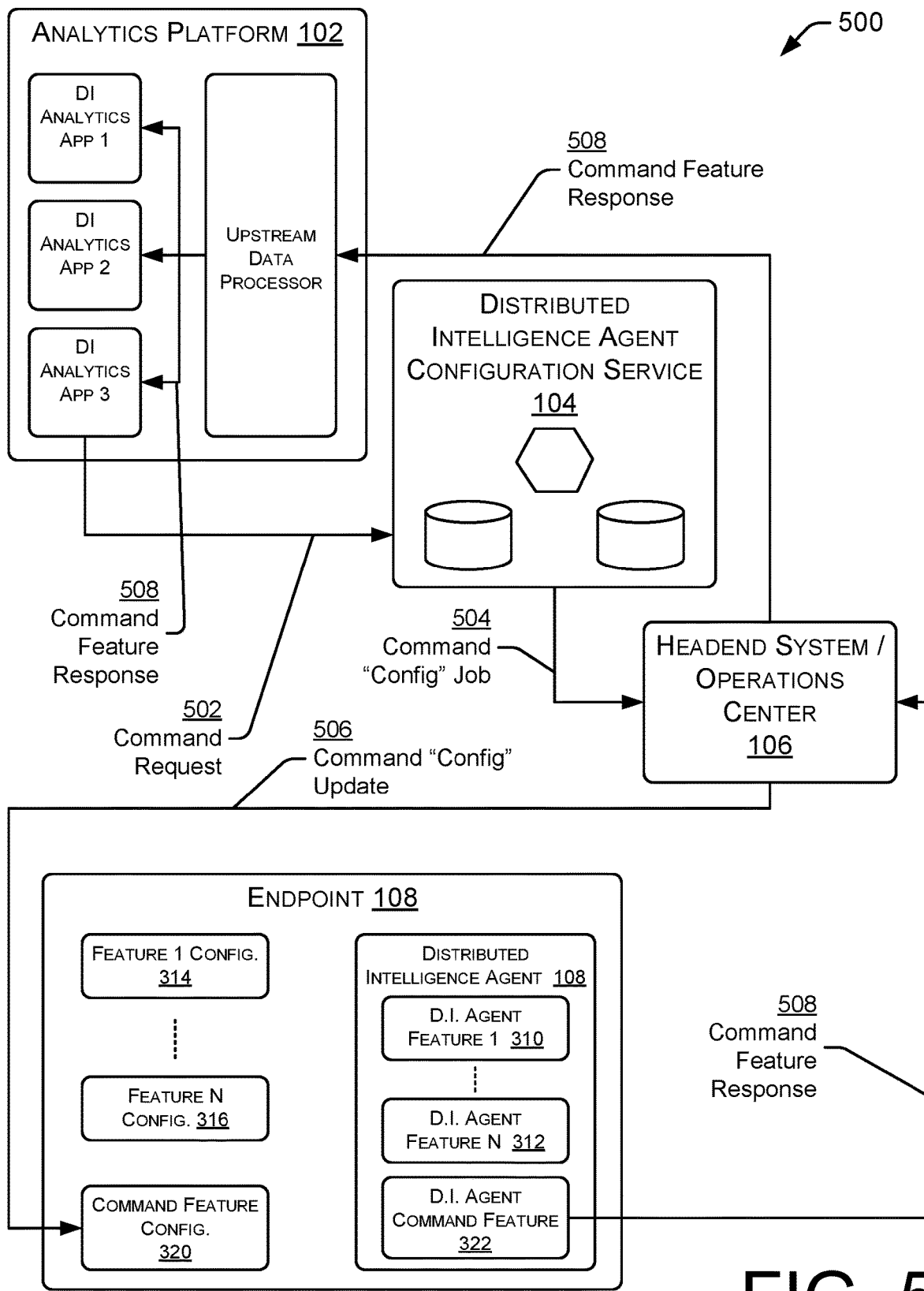
FIG. 5 is a block diagram showing techniques to send commands to endpoints using data structures also operable to send configuration information.

FIG. 5 shows techniques for use in a system 500 to send commands to endpoints using data structures also operable to send configuration information. In the example shown, an analytics platform 102 may be configured with one or more distributed-intelligence analytics applications. In an example, such applications consume the command feature responses 508 sent by features 310, 312 of an endpoint 108. An upstream data processor may be configured to process and interleave upstream data to appropriate distributed-intelligence analytics applications. Distributed-intelligence analytics applications may be configured to send command request messages 502 to the distributed-intelligence agent-configuration service 104.

The distributed-intelligence agent-configuration service 104 may be configured to include an API that can be used by applications on the analytics platform 102. The distributed-intelligence agent-configuration service 104 may also include applications that trigger a command message download to specific features (or agents) on one or more endpoints. In some systems, the downloading or transmission of command-containing messages will bypass the usual authorization requirement step that is part of the normal configuration sequence. Accordingly, commands are not delayed by a process that waits for authorization.

An endpoint 108 may include a plurality of distributed intelligence agents, represented by agent 308. The example shown, agent 308 includes distributed-intelligence agent features 310, 312, representing a plurality of features labeled 1 through N. Each feature 310, 312 may be configured according to configuration data 314, 316, which may be received from the distributed-intelligence agent-configuration service 104.

Example command feature configuration data 320 may be used to configure and/or provide commands to an example distributed-intelligence agent command feature 322. The distributed-intelligence agent command feature 322 is configured to decode a command sent within parameter(s) of a command configuration update 506, and to execute the decoded command. Accordingly, the distributed-intelligence agent command feature 322 provides flexibility to perform specific commands for which a distributed-intelligence agent feature 210, 312 is not configured to do. In an example, a one-time command may be sent for execution to the distributed-intelligence agent command feature 322, while commands performed frequently and/or repeatedly may be performed by a respective distributed-intelligence agent features 310, 312.

A command request 502 may be generated by a distributed intelligence analytics application within the analytics platform 102. The command request 502 may pass through the distributed-intelligence agent-configuration service 104.

In the service 104, the command request may be reconfigured as a command "configuration" update 504 or command "configuration" update 506, wherein the command request is encoded within a parameter of a reconfiguration message.

A command "configuration" update 506 is issued by the operations center (e.g., analytics platform 102, distributed-intelligence agent configuration service 104 and/or headend system 106) and is received as a command feature configuration 320 by the endpoint 108. The command feature configuration 320 may include executable programming statements encoded within a variable-length parameter of a configuration update message. Such configuration update messages are otherwise usable to configure (or reconfigure) a feature of an agent of the endpoint. The programming statements may be executed, such as by the distributed-intelligent command feature 322, to perform any intended function at the endpoint.

At command feature response 508 is sent from the endpoint (e.g., from the distributed-intelligence agent command feature 322. The command feature response 508 may be received at the analytics platform 102, where it may be passed to a distributed-analytics application operating on the platform.

FIG. 4 shows the downstream transmission of agent feature configuration data 404, and FIG. 5 shows the downstream transmission of command configuration updates 506. The command configuration updates 506 are not actual configurations, but are instead commands written into a configuration message. Thus, the same type of configuration file-format and/or data-structure, used to transmit configuration information to features 310-312, is also used to transmit command(s) to the command feature 322. This advantageously allows reuse of the downstream infrastructure for both purposes, i.e., configuration data and command data. Accordingly, considerable overhead that would have been required for a second downstream infrastructure, is avoided.

Example Methods

Figure 6:
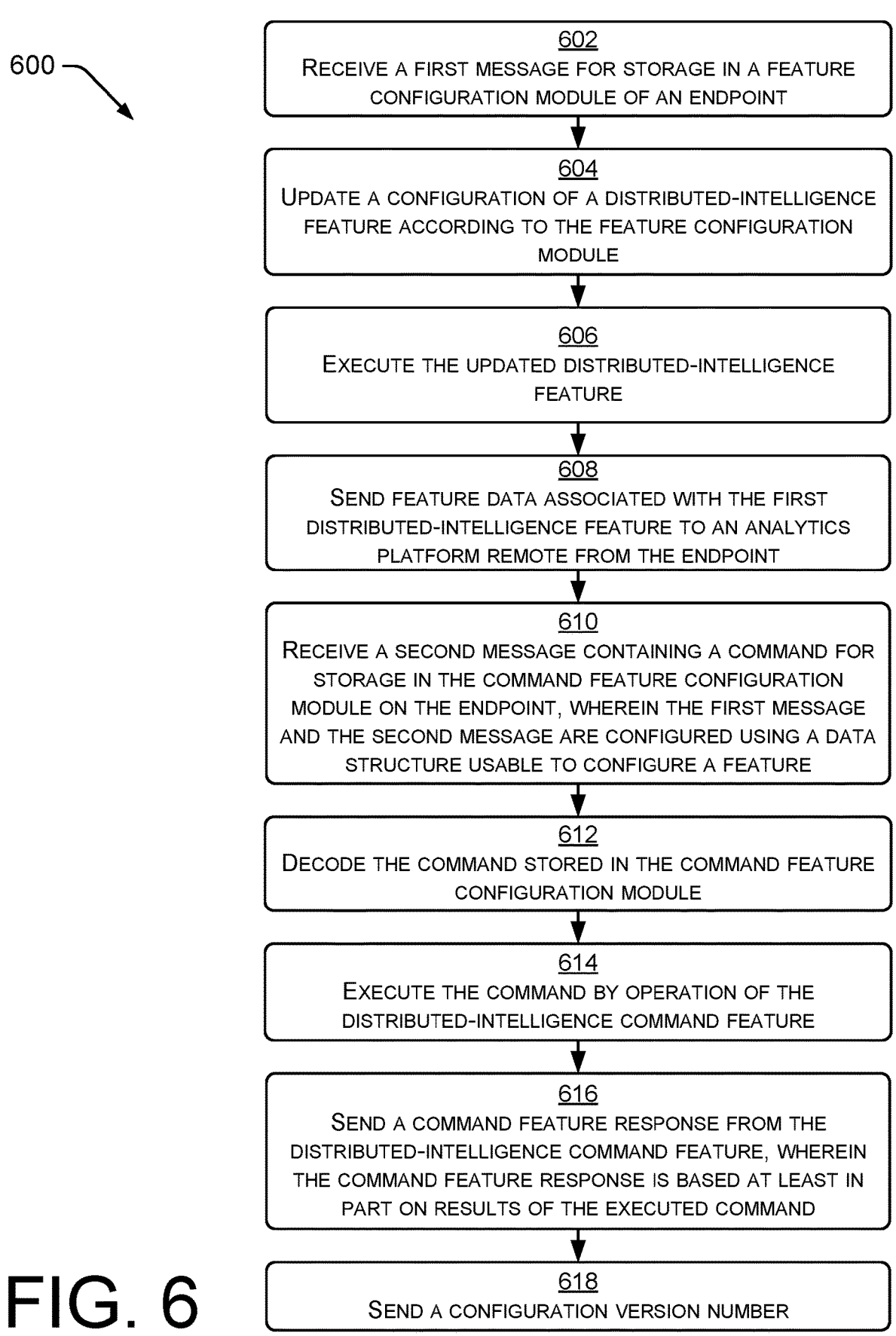
FIG. 6 is a flow diagram showing an example method by which an endpoint or other network-connected computing and/or metering device may receive configuration information and commands from an analytics platform or other computing device.

The example processes and/or methods of FIG. 6 can be understood in part by reference to the configurations of FIGS. 1 through 5. However, FIG. 6 has general applicability, and is not limited by other drawing figures and/or prior discussion.

Each process described herein is illustrated as a collection of acts, blocks or operations in a logical flow graph, which represent a sequence of operations that can be implemented in hardware, software, or a combination thereof. The processes may include storing, in a memory communicatively coupled to a processor, computer-executable instructions for performing a method, such as detecting failure of a cellular router, and then executing the instructions on the processor.

In the context of software, the operations represent computer-executable instructions stored on one or more computer-readable storage media that, when executed by one or more processors, perform the recited operations. Such storage media, processors and computer-readable instructions can be located within a system (e.g., endpoint 108 of FIGS. 1 and 3) according to a desired design or implementation. The storage media 306 seen in FIG. 3 is representative of storage media generally, both removable and non-removable, and of any technology. Thus, the recited operations represent actions, such as those described in FIG. 6, and are taken under control of one or more processors configured with executable instructions to perform actions indicated. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. The above discussion may apply to other processes described herein.

Computer storage media and/or memory includes volatile and non-volatile, removable and non-removable media implemented in any method or technology for storage of information such as computer readable instructions, data structures, program modules, or other data. Computer storage media includes, but is not limited to, random access memory (RAM), read only memory (ROM), electrically erasable programmable read only memory (EEPROM), flash memory or other memory technology, compact disk-read only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. Any such computer storage media may be part of the endpoint 108. Moreover, the computer-readable media may include computer-executable instructions that, when executed by the processor(s) 300, perform various functions and/or operations described herein.

Additionally, for purposes herein, a computer readable media may include all or part of an application specific integrated circuit (ASIC) or other hardware device. Such a hardware device may be configured to include other functionality, including functions performed in synchronizing nodes in a network. Accordingly, within such an integrated circuit, one or more processors are configured with executable instructions, which may be defined by logic, transistors or other components, or on-board memory.

In contrast, communication media may embody computer-readable instructions, data structures, program modules, or other data in a modulated data signal, such as a carrier wave, or other transmission mechanism. As defined herein, computer storage media does not include communication media and/or carrier waves, data signals, or other transitory media.

FIG. 6 is a flow diagram showing an example method 600 by which an endpoint or other network-connected computing and/or metering device may receive configuration information and commands from an analytics platform or other computing device.

At block 602, a first message is received for storage in a feature configuration module of the endpoint. In the example of FIG. 5, feature configuration modules 314 through 316 are configured to contain the configuration data used to configure the distributed-intelligence features 310 through 312. Thus, each of the plurality of features 310 through 312 is associated with a feature configuration module 314 through 316, such as in a one-to-one relationship. The configuration module of each feature provides data that may be used for many different purposes, such as to regulate an amount by which temperature readings are adjusted, an amount by which voltage measurements are adjusted, a timing by which messages are transmitted, etc. Thus, each feature provides function(s) and the configuration data may be used to provide regulation, enhancement, adjustment, etc. of those functions.

At block 604, a configuration of a distributed-intelligence feature is updated according to the feature configuration module associated with that feature. In the example of FIG. 5, the distributed-intelligence feature 310 is one of several features in the distributed-intelligence agent 108 operating on the endpoint 108. The configuration of distributed-intelligence feature 310 is updated to reflect the latest configuration parameters and/or version of the associated feature configuration module 314.

At block 606, the updated and/or reconfigured distributed-intelligence feature is executed. In an example, each feature provides a reusable, executable module that can be configured and used for a particular purpose(s). In a further example, during or after execution of the feature, feature data associated with the distributed-intelligence feature is sent to an analytics platform remote from the endpoint.

At block 608, feature data associated with the distributed-intelligence feature is sent to an analytics platform remote from the endpoint. Referring to FIG. 4, the feature data 408 leaves the feature 310 of the agent 108 and is sent to the analytics platform 102.

At block 610, a second message containing a command is received at the endpoint, such as for storage in a command feature configuration module on the endpoint. In the example of FIG. 5, the command feature configuration 320 receives a message. The first and second messages may share a same data structure and/or format. Alternatively or additionally, the first message and the second message may both be configured using a data structure usable to update a configuration of a feature. That is, the configuration format, used by feature configuration module 314 through 316 may also be used for, and sent to, the command feature configuration module 320. In an example, data structure locations used to store parameters in a configuration message may be used to contain an encoded command, and optional command parameters. This allows a system designed and structured to send configuration data to also send commands to the command feature configuration module 320. Advantageously, this allows more efficient use of the system 500, and does not require modification of the underlying firmware and/or other layers of software.

At block 612, the command received by, and/or stored in, the command feature configuration module may be decoded. In the example of FIG. 5, the command feature configuration module contains a command and optionally command parameters, command arguments, command modifiers, etc. The command may be decoded, if necessary, and moved to the distributed-intelligence command feature for execution. In an example, decoding the command may involve recognizing a unique feature-identification data string that identifies a parameter as an encoded command.

At block 614, the command is executed by operation of the distributed-intelligence command feature. In an example, the command may be used to perform a one-time command or to temporarily change a setting of a feature that is not exposed in configuration parameters.

At block 616, a command feature response may be sent from the distributed-intelligence command feature, to a headend system and/or analytics platform. In the example of FIG. 5, the command feature response 508 is sent to the headend system 106, and then into the analytics platform 102.

At block 618, a configuration version number may be sent to the headend system and/or analytics platform. The version number may be configured as any alpha-numeric data string and/or a data structure, and is not limited to an actual "number." The version number may show the version of each feature of each agent and/or each agent-feature configuration on the endpoint. FIG. 2 shows an example of the distributed-intelligence agent-configuration service 104, where the database 202 records the configuration of each agent of each endpoint and/or one or more agent-feature configurations of each endpoint. FIG. 4 shows example use of, and update of, a version number. The system 400 of FIG. 4 may be configured to automatically send a new version number when a feature has been updated to a new configuration. Thus, update of the configuration of the features 310 through 312 results in a new version number for each updated feature. Similarly, execution of a command by the command feature 322 may result in an updated version number associated with that feature. In contrast, system 500 of FIG. 5 allows execution of commands without using the version number system describing the status of the features 314-316 or changing the version number.

In an example of the sending of a configuration version number, the configuration version number may be updated responsive to receiving a first message (e.g., the message of block 602), and/or updating the configuration of a feature of the endpoint, and/or executing the updated distributed-intelligence feature. However, the configuration version number is not updated responsive to receiving the second message containing a command, and/or decoding the command, and/or executing the command, and/or sending the command feature response.

In a further example of the sending of a configuration version number, the configuration version number may be updated (e.g., prior to sending) responsive to effects of any of receiving the second message, decoding the command, executing the command, and/or sending the command feature response. In an example, FIG. 4 shows example events that result in updating the configuration version number 406 (or alternative data structure) in response to a configuration job that updates feature(s).

However, in the example of FIG. 5, a configuration version number is not incremented in the event that a command is sent within a data structure usable to update a configuration of a feature (e.g., the command 504 sent within a message having a data structure adapted for re-configuration of a feature). In a still further example, the endpoint may send a configuration version number. However, the configuration version number may not be sent, or may be unchanged, by execution of commands obtained from the data structure (e.g., as discussed at block 610) usable to update configuration of feature do not change the configuration version number.

EXAMPLE IMPLEMENTATIONS

The below example describes the design of downstream messaging functionality, including distributed analytics agent commands, such as by using a distributed analytics agent configuration data channel. In the example, a foundation may include four main components to the distributed analytics (DI) system. First, distributed analytics agents run on endpoints and include one or more features. Features can be considered as a translation function, taking data from the endpoint (e.g., metering information) and applying algorithms to it to identify important events or trends. These outputs may be sent upstream to the DI head-end system for further analysis. DI agents are small downloadable objects that do not impact the endpoint's daily job. As such, they can easily be downloaded for updates quickly and without the cumbersome process of regulatory approvals. Second, a collection manager is a conduit system used to pass communications to and from the endpoints to the DI head-end system. Third, an analytics platform receives periodic upstream data from endpoints and DI agents and provides the data to DI applications. Applications run within the analytics platform framework to generate useful analytical data. Fourth, a DI agent configuration service is used to make changes to agent-feature configurations. The configurations are managed on a per-feature basis and include configuration parameters.

In the example, an agent-feature configuration process is used. Agents are a collection of features that run on the endpoints. The features may have configurable parameters such as thresholds, algorithm constants, or settings. In an example of the DI system, a downstream channel allows for transmission of these configuration parameters to the feature using the collection manager to deliver the packaged configuration(s) to the relevant endpoints. In an example, the channel is not extendable without changes to endpoint firmware, collections manager, and some other associated services and components that are involved in message transfer across the solution.

In the DI head-end system, a DI agent configuration (DIAC) service has may be used to create updated configurations and manage a download job (using the collections manager) to ensure that the updated parameter values reach the endpoints selected. Configurations are managed at a feature level, meaning that a single feature can be updated for an agent independently of other features. The DIAC service maintains an "effective configuration" record for each feature on each endpoint in the system by keeping track of the config change jobs throughout history.

To keep track of configuration updates, and to verify the update has reached the endpoint(s), a simple version number solution may be used. Each time an update to a specific feature in an endpoint is created in the DIAC service, the version is incremented. Version numbers are sent upstream in periodic messages from the endpoints so that they can be compared by the DIAC service and checked for consistency. This provides positive feedback from the endpoints that an update has been received and deployed to the agent feature.

The format of the configuration module and/or file is not critical. In the example, configurations are utilized per feature (not per agent), and more than one parameter is free-format and may be defined by the agent and/or applications developers, and can be used to build custom command messages.

In some examples, messages may be sent directly from DI applications in the analytics platform, to DI agent features on endpoints. Such messages might be used to perform one-time commands on a feature, or to temporarily change a setting that is not exposed in the configuration parameters.

In an example, a DI system may have a design and implementation that does not provide a new downstream message channel to support transmission of this type of message to the agent features. In order to add such a channel, changes would be required across the system and would necessitate major upgrades to endpoint firmware, collection manager, and a number of associated interfacing systems.

The examples presented herein take advantage of the existing downstream configuration channel and upstream periodic data transfer to send messages and receive responses from those messages if required. There are advantages of such example configurations. First, no changes are required to the endpoint firmware, collection manager, or associated interfacing systems. Second, a DI agent configuration service can be used almost as-is to track the message delivery process. Third, the DI agent configuration service keeps a history of the downloads, so a log of all commands is maintained automatically, for diagnostics purposes.

Agents that are to be configured to exploit the downstream messaging service will need to be updated to include a new command feature that can be used for this purpose (e.g., DI Agent Command Feature 322 in FIGS. 3 and 5). This feature will be explicitly designed to accept an incoming update to a configuration and decode the new parameters as commands.

Apps that are to be configured to exploit the downstream messaging service in this example will need to be updated to use a DI agent configuration API call to send the message to their new agent feature for commands.

The DI agent configuration service may utilize an API that can be used by analytics platform apps to trigger a command message download to specific features on one or more endpoints. This will bypass the usual authorization requirement step that is part of the normal configuration sequence so that commands are not delayed awaiting authorization.

The format for a command would look similar to that of a regular configuration, but would include a new feature. In this example, the feature is called "Command" and has a unique feature-id as shown. The command being invoked is "ClearPersistentData" that takes no parameters (value=""), but other commands may take parameters in the value field. This format and the parameters involved are at the discretion of the developer.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. An endpoint, comprising:
a processing unit;
a metrology unit in communication with the processing unit; and
a memory device in communication with the processing unit, the memory device comprising:
at least one distributed-intelligence agent, each of the at least one distributed-intelligence agent executable by the processing unit;
a plurality of distributed-intelligence features, defined within at least one of the at least one distributed-intelligence agent;
a plurality of feature configuration modules, each feature configuration module associated with a respective distributed-intelligence feature, wherein the respective distributed-intelligence feature is configured according to the feature configuration module with which the respective distributed-intelligence feature is associated;
a command feature configuration module, wherein the command feature configuration module is one of the plurality of feature configuration modules, to accept an incoming update to a configuration and decode at least one parameter of the incoming update as a command; and
a distributed-intelligence command feature, wherein the distributed-intelligence command feature is one of the plurality of distributed-intelligence features and executes the command;
wherein the memory device additionally comprises executable statements for:
receiving a first message for storage in a feature configuration module of the endpoint;
updating a configuration of a distributed-intelligence feature according to the feature configuration module;
executing the updated distributed-intelligence feature;
receiving a second message containing a command for storage in the command feature configuration module on the endpoint, wherein the first message and the second message are both configured using a same type of data structure usable to update a configuration of a feature, and wherein the same type of data structure used to store configuration information of the first message is used to store the command of the second message;
decoding the command stored in the command feature configuration module;
executing the command by operation of the distributed-intelligence command feature; and
sending a command feature response from the distributed-intelligence command feature, wherein the command feature response is based at least in part on results of the executed command.

2. The endpoint of claim 1, wherein sending the command feature response comprises:
sending the command feature response to an analytics application of an analytics platform.

3. The endpoint of claim 1, wherein the command is used to perform a one-time command or to temporarily change a setting of a feature that is not exposed in configuration parameters.

4. The endpoint of claim 1, wherein decoding the command comprises:
recognizing a unique feature-identification data string that identifies a parameter as an encoded command.

5. The endpoint of claim 1, wherein the memory device additionally comprises executable statements for:
sending feature data associated with the at least one of the plurality of distributed-intelligence features to an analytics platform remote from the endpoint.

6. The endpoint of claim 1, wherein the memory device additionally comprises executable statements for:
sending a configuration version number;
wherein the configuration version number was updated responsive to receiving the first message, updating the configuration, and/or executing the updated distributed-intelligence feature; and
wherein the configuration version number was not updated responsive to receiving the second message, decoding the command, executing the command, and/or sending the command feature response.

7. The endpoint of claim 1, wherein the memory device additionally comprises executable statements for:
sending a configuration version number;
wherein the configuration version number of the endpoint was not updated responsive to effects of any of:
receiving the second message;
decoding the command;
executing the command; and
sending the command feature response.

8. The endpoint of claim 1, wherein the memory device additionally comprises executable statements for:
sending a configuration version number, wherein commands obtained from data structure do not change the configuration version number.

9. A method of receiving commands at an endpoint, the method comprising:
under control of one or more processors of the endpoint configured with executable instructions;

receiving a first message for storage in a feature configuration module of the endpoint;

updating a configuration of a distributed-intelligence feature according to the feature configuration module, wherein the distributed-intelligence feature is one of a plurality of distributed-intelligence features, and wherein each of the plurality of distributed-intelligence features is associated with a respective one of a plurality of distributed-intelligence feature configuration modules;

executing the updated distributed-intelligence feature;

receiving a second message containing a command for storage in a command feature configuration module on the endpoint, wherein the first message and the second message are both configured using a data structure usable to update a configuration of a feature, and wherein the first message and the second message share a same data structure;

decoding the command stored in the command feature configuration module;

executing the command by operation of a distributed-intelligence command feature; and sending a command feature response from the distributed-intelligence command feature, wherein the command feature response is based at least in part on results of the executed command.

10. The method of claim 9, wherein sending the command feature response comprises:

sending the command feature response to an analytics application of an analytics platform on a server remote from the endpoint.

11. The method of claim 9, wherein decoding the command comprises:

decoding the command from data within a parameter of the second message.

12. The method of claim 9, wherein receiving the first message comprises:

receiving configuration information associated with the distributed-intelligence feature.

13. The method of claim 9, additionally comprising:
sending a configuration version number;
wherein the configuration version number was updated responsive to receiving the first message, updating the configuration, and/or executing the updated distributed-intelligence feature; and
wherein the configuration version number was not updated responsive to receiving the second message, decoding the command, executing the command, or sending the command feature response.

14. The method of claim 9, additionally comprising:
sending a configuration version number;
wherein the configuration version number of the endpoint was not updated responsive to effects of any of:
receiving the second message;
decoding the command;
executing the command; and
sending the command feature response.

15. An endpoint, comprising:
a processing unit;
a metrology unit in communication with the processing unit; and
a memory device in communication with the processing unit, wherein the memory device comprises executable statements for:
receiving a first message for storage in a feature configuration module of the endpoint;
updating a configuration of a distributed-intelligence feature according to the feature configuration module, wherein the distributed-intelligence feature is one of a plurality of distributed-intelligence features, and wherein each of the plurality of distributed-intelligence features is associated with a respective one of a plurality of distributed-intelligence feature configuration modules;
executing the updated distributed-intelligence feature;
receiving a second message containing a command for storage in a command feature configuration module on the endpoint, wherein the first message and the second message are both configured using a same type of data structure usable to update a configuration of a feature, and wherein the same type of data structure used to store configuration information of the first message is used to store the command of the second message;
decoding the command stored in the command feature configuration module;
executing the command by operation of a distributed-intelligence command feature; and
sending a command feature response from the distributed-intelligence command feature, wherein the command feature response is based at least in part on results of the executed command.

16. The endpoint of claim 15, wherein sending the command feature response comprises:
sending the command feature response to an analytics application of an analytics platform.

17. The endpoint of claim 15, wherein the memory device comprises executable statements for:
sending a configuration version number;
wherein the configuration version number was updated responsive to receiving the first message, updating the configuration, and/or executing the updated distributed-intelligence feature; and
wherein the configuration version number was not updated responsive to receiving the second message, decoding the command, executing the command, and/or sending the command feature response.

18. The endpoint of claim 15, wherein the memory device comprises executable statements for:
sending a configuration version number;
wherein the configuration version number of the endpoint was not updated responsive to effects of any of:
receiving the second message;
decoding the command;
executing the command; and
sending the command feature response.

19. The endpoint of claim 15, wherein the memory device comprises executable statements for:
sending a configuration version number, wherein commands obtained from data structure do not change the configuration version number.

* * * * *